United States Patent
Buelow et al.

(10) Patent No.: US 7,813,549 B2
(45) Date of Patent: Oct. 12, 2010

(54) IMAGE SEGMENTATION IN A VOLUME DATA SET

(75) Inventors: Thomas Buelow, Grosshansdorf (DE); Michael Grass, Buchholz in der Nordheide (DE); Christian Lorenz, Hamburg (DE); Robert Manzke, Husberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 965 days.

(21) Appl. No.: 10/596,148

(22) PCT Filed: Nov. 26, 2004

(86) PCT No.: PCT/IB2004/052569

§ 371 (c)(1), (2), (4) Date: Dec. 20, 2006

(87) PCT Pub. No.: WO2005/057491

PCT Pub. Date: Jun. 23, 2005

(65) Prior Publication Data

US 2007/0225598 A1 Sep. 27, 2007

(30) Foreign Application Priority Data

Dec. 8, 2003 (EP) .................................. 03104570

(51) Int. Cl.
G06K 9/34 (2006.01)
G06K 9/00 (2006.01)
(52) U.S. Cl. .................. 382/173; 382/103; 382/128
(58) Field of Classification Search .................. 382/103, 382/128–132, 173–180
See application file for complete search history.

(56) References Cited

U.S. PATENT DOCUMENTS

| 5,239,591 | A | | 8/1993 | Ranganath | |
| 5,960,111 | A | * | 9/1999 | Chen et al. | 382/173 |
| 6,031,935 | A | * | 2/2000 | Kimmel | 382/173 |
| 6,047,080 | A | | 4/2000 | Chen et al. | |
| 6,501,848 | B1 | | 12/2002 | Carroll et al. | |
| 6,754,376 | B1 | | 6/2004 | Turek et al. | |
| 2005/0008210 | A1 | | 1/2005 | Evron et al. | |
| 2006/0159341 | A1 | * | 7/2006 | Pekar et al. | 382/173 |
| 2006/0210158 | A1 | * | 9/2006 | Pekar et al. | 382/173 |
| 2007/0276228 | A1 | * | 11/2007 | Vining et al. | 600/425 |

FOREIGN PATENT DOCUMENTS

WO  WO 2004/006841 A1  8/2004

OTHER PUBLICATIONS

Gupta, A., et al.; Cardiac MR Image Segmentation Using Deformable Models; 1993; IEEE Proc. of the Computers in Cardiology Conference; pp. 747-750.
Cornelis, J., et al.; Techniques for Cardiac Image Segmentation; 1992; IEEE Proc. of the Int'l. conf. of the Engineering in Medicine and Biology Soc.; 5(14)1906-1908.

* cited by examiner

*Primary Examiner*—Manav Seth

(57) ABSTRACT

Coronary artery segmentation is a crucial task in cardiac CT image processing. This is often a tedious task performed manually by an operator. According to the present invention, a method is provided which combines data from multiple cardiac phases during the segmentation process in order to deliver a complete and continuous coronary vessel tree. Advantageously, this may allow for an improved visualization and segmentation of vessels, for example, in coronary CTA.

20 Claims, 3 Drawing Sheets

IMAGE SEGMENTATION IN A VOLUME DATA SET

The present invention relates to the field of digital imaging, in particular in medical applications. In more detail, the present invention relates to a method of segmenting an object of interest in a volume data set, to an image processing device and to a computer program for segmenting an object of interest in a volume data set.

Computed tomography (CT) scans provide a non-invasive method of imaging the human body. One particular area of interest is imaging the heart and the vessels contained in the heart. Clinicians are especially interested in examining the coronary arteries, because they provide the doctor with crucial information for the diagnosis and therapy of coronary artery disease.

Medical images of a subject's heart are typically comprised of several slices throughout the 3D volume of the heart. In addition, the heart may be imaged at several different instances or phases (heart phases) in the cardiac cycle. Thus, the ensemble of all images gives a picture of the heart during, for example, the complete course of one heart beat.

It is often desirable to use this set of images or data set to extract information about the structure of the heart. Doctors may use existing techniques for examining the data provided by a cardiac CT scan, including standard two and three-dimensional viewing techniques. However, if they wish to examine, for example, the three-dimensional vessel tree of the heart, doctors must often tediously segment the vessel tree by hand from either axial CT images or a 3D rendering of the image data. This may take several hours and require the physician to manually define what is part of the vessel tree.

It is an object of the present invention to provide for an improved segmentation of an object of interest, such as, for example, the coronary artery tree of a human heart in a data set.

According to an exemplary embodiment of the present invention as set forth in claim 1, the above object may be solved by a method of segmenting an object of interest in a data set, the data set comprising at least a first image and a second image, wherein the object of interest is firstly segmented in the first image for determining a first segmentation result. In case it is determined that a structure, i.e. part of the object of interest cannot sufficiently be segmented in the first image, a segmentation of this structure is performed in a first region of the second image for determining a segmentation result. In the second image, a segmentation is continued in the first region, which covers a local surrounding of the first structure.

In other words, for the segmentation of the coronary artery tree from a coronary CTA (computed tomography angiography) volume data set, a segmentation of a vessel is started in an image relating to an initial phase. Image in this context is to be understood as an at least two dimensional data relating to a phase of the heart. Then, in case the segmentation fails, i.e. in case no continuation of the vessel is found, the segmentation is moved to an adjacent image of an adjacent heart phase and, in the local region of the area where no continuation was found in the image of the initial phase, a segmentation is performed in the second adjacent image. In case there is no continuation of the vessel found in the second adjacent image, the method continues to the next adjacent image, i.e. an image adjacent to the second image, where the segmentation continues in the immediate neighborhood of the point where the segmentation stopped in the second image. The information derived from the segmentation in the second and third images is used together with the segmentation information derived from the first initial image and may be used to perform an image, which is based on segmentation information on the three images relating to adjacent heart phases.

This may allow for an improved segmentation, for example, of vessels in coronary CTA.

According to another exemplary embodiment of the present invention as set forth in claim 1, the first and second segmentation results from the first and second images are combined to form an image, which is based on segmentation information from the first (initial) image and the second image, where the segmentation was performed locally. Advantageously, this may allow for an improved visualization, for example, of vessels in coronary CTA. Furthermore, this may allow for a continuous and smooth visualization, for example, of the coronary vessels.

According to another exemplary embodiment of the present invention as set forth in claim 3, the segmentation is locally shifted from one image to the next adjacent image (for example, along a pre-selected direction), such that a segmentation in the subsequent image is only performed in a region where the segmentation of, for example, an artery branch, stopped in the preceding image, i.e. where no continuation for this artery (vessel) branch could be found. Due to this, the segmentation may, for example, be performed through a plurality of phases of the heart, for example, throughout a full cycle.

Advantageously, this may allow for an improved segmentation quality, i.e. of a more accurately segmented object of interest, such as the coronary artery tree.

According to another exemplary embodiment of the present invention as set forth in claim 4, a direction is selected, in which the next image is selected where the segmentation is to be performed locally. In other words, for example, with respect to the heart phases, it is selected whether images of preceding phases, i.e. preceding the initial phase, should be selected for performing the local segmentation or images relating to succeeding phases.

According to another exemplary embodiment of the present invention as set forth in claim 5, the data set is a coronary CTA data set, which comprises data from a plurality of cardiac phases and the method is for the segmentation of a coronary artery tree.

Advantageously, this may significantly improve diagnostics, since the tedious task, for example, of manually segmenting the coronary artery tree, may be replaced by an automatic process, as described above. Furthermore, a very fast segmentation yielding a very accurate segmentation result may be provided.

According to another exemplary embodiment of the present invention as set forth in claim 6, an image processing device is provided, comprising a memory and an image processor. The image processor is adapted to perform a segmentation on data, for example, relating to a first phase of the human heart. When, for example, an object of interest such as a coronary artery tree is segmented in such an image, it may occur that the segmentation stops, i.e. that no continuation of a certain branch of the artery tree is found in the first image. Then, according to this exemplary embodiment of the present invention, an adjacent image (for example, of an adjacent heart phase) is selected and the segmentation is continued in this second image. In particular, the segmentation is continued in the second image in a region of the image covering the immediate surrounding of the area where the segmentation in the first image stopped. Thus, it may not be necessary to perform a segmentation for the full second image, but a segmentation may only be continued for a small region of the second image, which may significantly speed up processing.

Claims 7 and 8 provide for further exemplary embodiments of the image processing device according to the present invention.

According to another exemplary embodiment of the present invention as set forth in claim 9, a computer program is provided for segmenting an object of interest in a volume data set. The computer program may be written in any suitable programming language, such as C++ and may be stored on a computer readable device such as a CD-ROM. However, the computer program according to the present invention may also be presented over a network such as the WorldWideWeb, from which it may be downloaded into, for example, a working memory of a processor.

It may be seen as the gist of an exemplary embodiment of the present invention, taking the coronary artery segmentation in cardiac CT image processing as an example, that in case no continuation is found for a particular branch of the coronary artery tree in an image relating to an initial heart phase, the segmentation is continued locally in an adjacent image of an adjacent heart phase. In case no continuation for this particular branch is found in the second image, the next adjacent third image is selected and a segmentation is continued locally in this third image. The segmentation is continued in the respective succeeding image in a locally restricted area surrounding the point of structure where the segmentation stopped in the preceding image. The segmentation results of the various images are then combined to form one image, which may be visualized, i.e. displayed by a display. Advantageously, this may allow for a very good segmentation result.

These and other aspects of the present invention will become apparent from and elucidated with reference to the embodiments described hereinafter.

Exemplary embodiments of the present invention will be described in the following, with reference to the following drawings.

Figure 1:
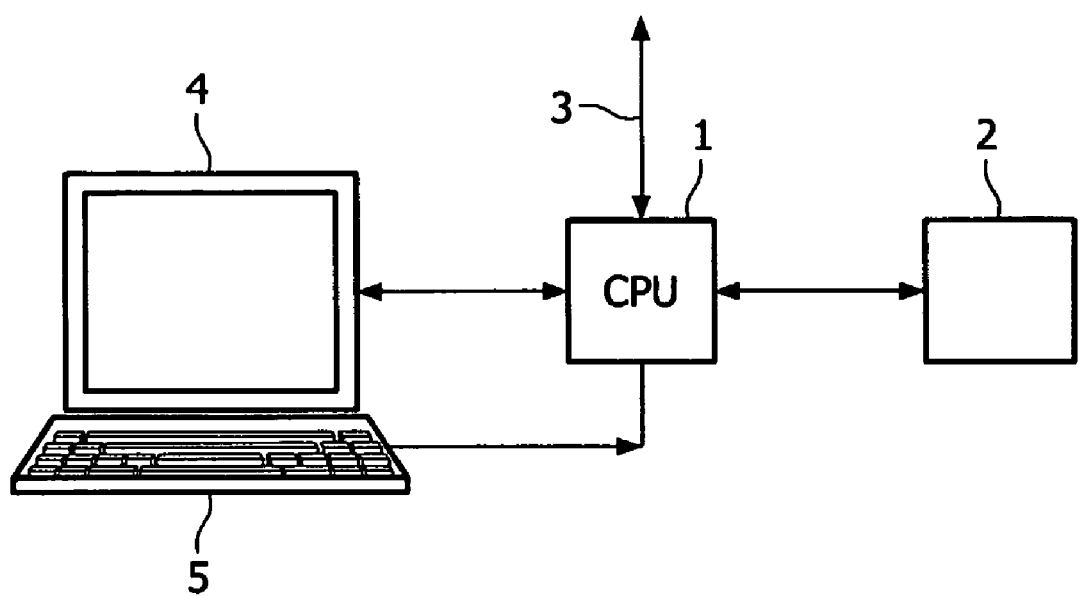
FIG. 1 shows a schematic representation of an image processing device according to an exemplary embodiment of the present invention, adapted to execute a method according to an exemplary embodiment of the present invention.

FIG. 1 depicts an exemplary embodiment of an image processing device according to the present invention, for executing an exemplary embodiment of a method in accordance with the present invention. The image processing device depicted in FIG. 1 comprises a central processing unit (CPU) or image processor 1 connected to a memory 2 for storing a data set, for example, cardiac CT image data. The image processor 1 may be connected to a plurality of input/output, network or diagnosis devices such as a CT scanner or, for example, an MR device or ultrasonic scanner. The image processor is furthermore connected to a display device 4 (for example, a computer monitor) for displaying information or images computed or adapted in the image processor 1. An operator may interact with the image processor 1 via a keyboard 5 and/or other output devices, which are not depicted in FIG. 1. The image processing device depicted in FIG. 1 is adapted to perform the method according to the present invention described in the following with reference to FIGS. 2 and 3. Furthermore, the image processing device depicted in FIG. 1 is adapted to execute a computer program according to the present invention, causing the image processing device to perform the method according to the present invention.

Figure 2:
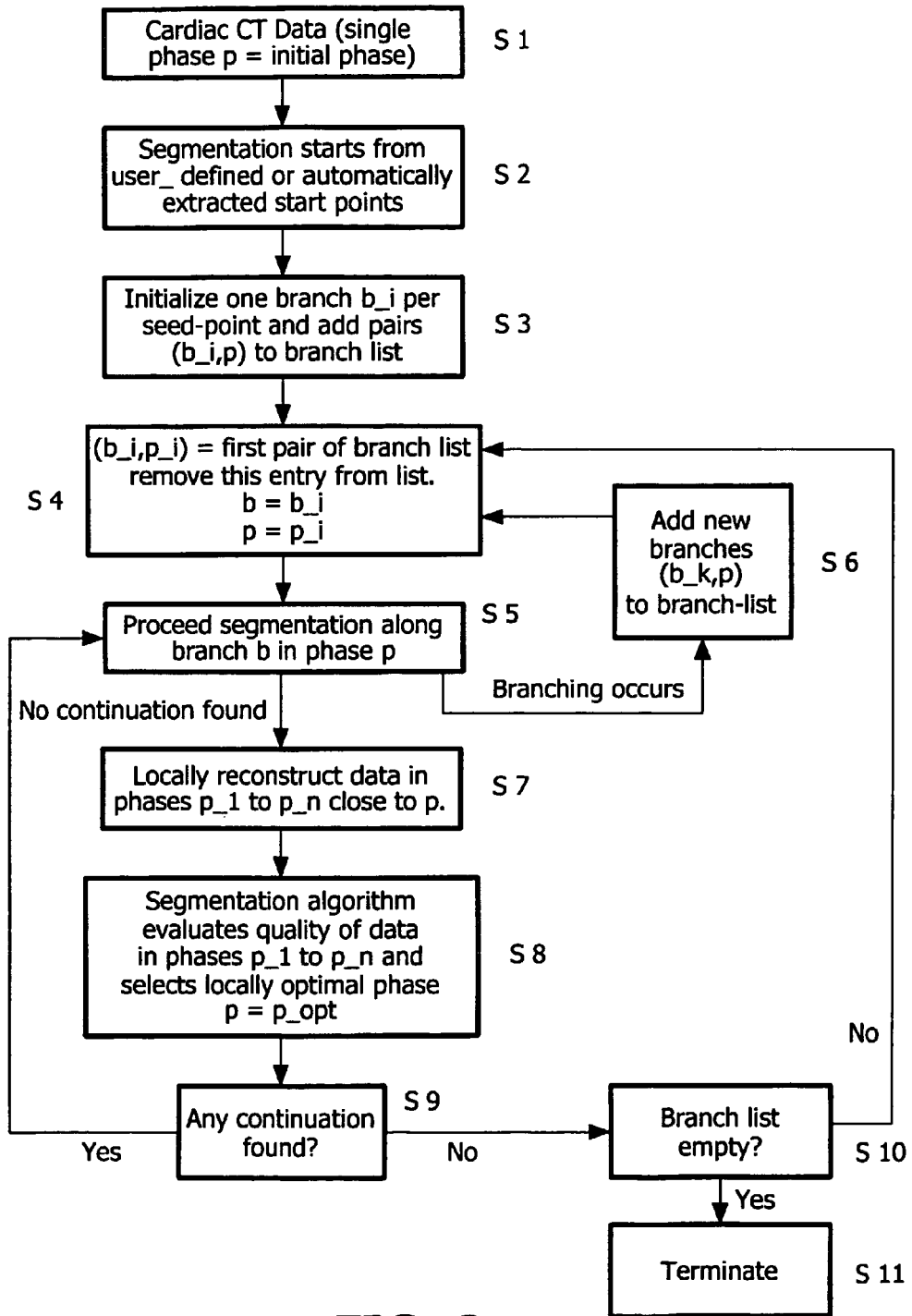
FIG. 2 shows a simplified flow-chart of an exemplary embodiment of a method according to the present invention, which may be used for operating the image processing device depicted in FIG. 1.

FIG. 2 shows a flow-chart of an exemplary embodiment of a method of the present invention, where the present invention is described with respect to the example of the coronary artery segmentation in CT image processing. However, it should be understood that the present invention is not limited to application in the coronary artery segmentation, but may be applied to the segmentation of objects of interest from multi-dimensional data sets in general. In particular, the present invention is suitable for multi-dimensional volume data sets, where data relating to different points in time, different projections, different view points or different phases of a moving object of interest are gathered.

As may be taken from FIG. 2, in step S1, cardiac CT data is acquired. It may either read out from a memory or may be acquired from a CT scanner. The data acquired in step S1 is an image of an initial heart phase. Then, in the subsequent step S2, the segmentation is started from one or more user-defined or automatically extracted start points. Then, in the subsequent step S3, one branch b_i is initialized per seed-point, determined in step S2 and pairs of branches (b_i,p) are added to a branch list. Then, in the subsequent step S4, the branch list is actualized.

Each new branch b_i is represented by its location coordinates (or coordinates in space) relating to the location where the branch starts and by the phase p_i in which the continuation of the respective branch b_i is to be searched for. This information is symbolized by (b_i, p_i) in step S4. A list of all branches which have to be continued, i.e. which have to be grown further is stored in a queue (or list). New branches which are generated by branchings (in S5) are added to the end of the queue. The queue contains only initialization information about branches which are yet to be segmented.

In step S4, the first branch is taken from the queue (which may also be a FIFO stack) and is expanded on the basis of its starting coordinates (space or location) and phase in step S5. It should be noted that instead of the sorting in the list, the branch selected in step S4 may also be selected on the basis of other criteria. E.g. the branch having the largest diameter may be selected first.

In step S5, the segmentation proceeds along branch b in the initial phase p. In case a branching occurs, the method continues from step S5 to step S6, where the new branches (b_k;p) are added to the branch list. Then, from step S6, the method continues to step S4.

In case the segmentation in step S5 is unsuccessful or fails, i.e. that no continuation of a particular branch b is found in the image of phase p, the method continues to step S 7 where a localized data reconstruction is performed in the phases p_1 to p_n close to p.

In step S7, where, in a second image relating to an adjacent phase, i.e. to a phase of the heart neighboring the initial phase, a local reconstruction of the branch is performed in a region surrounding the area where the segmentation stopped in the preceding image here in the initial phase. As indicated in step S7, the method may continue to locally reconstruct data in a plurality of phases, i.e. in a plurality of images relating to a plurality of phases. For this, the other phase images may subsequently be examined whether, in the respective local area, a continuation of the respective branch is found. This is described further with reference to steps S8 and S9.

In step S8, the phase p is set to the optimum phase p_opt (the most suitable phase image to continue the segmentation) such that p does not have to correspond to the initial phase any more. Also, in step S8, the phase is actualized which causes that the phase p in step S5 does no longer coincide with the phase where the segmentation was initialized. Due to this, in step S6, where new branches are added to the queue, the phase from step S5 is used which, usually, does not coincide with the initial phase of step S1.

As indicated in step S8, the segmentation algorithm is applied to the local regions in the phases p_1 to p_n and the optimal phase p=p_opt may be selected. In other words, from the other images of the CT data sets, i.e. images relating to phases other than the initial phase, the segmentation is performed locally in the region where the segmentation of a particular branch could not find a continuation of this branch in the initial image for searching continuations in the other phases. Then, the optimal phase, i.e. the image relating to the optimal phase is selected. This is the phase image containing sufficient information with respect to the particular branch b, such that a segmentation continues.

It should be noted that in case all phase images are available at the beginning, a selection of the most suitable of best phase images may be performed in steps S7 and S8 such that no further or extra reconstruction has to be performed.

Then, in step S9, a request is made whether a continuation could be found in the image relating to p_opt. In case it is determined in step S9 that a continuation could be found, the method returns to step S5 and continues iteratively.

In case it is determined in step S9 that no continuation could be found in any of the other phase images (not in the image relating to p_opt), the method continues to step S10, where it is determined whether the branch list is empty or not, i.e. whether there are any remaining branches of the coronary artery tree which have not yet been fully segmented. In case it is determined in step S10 that there are still branches in the branch list, the method returns to step S4.

In case it is determined in step S10 that the branch list is empty, the method continues to step S11, where it terminates.

As described above, a segmentation method is proposed which combines data from multiple cardiac phases during the segmentation process in order to deliver a complete and continuous coronary vessel tree. Segmentation is started in one initial phase. If no continuation of a vessel can be found, a continuation is sought in a neighborhood (in phase as well as spatially). Thus, the segmentation process uses high spatial resolution volume data from various cardiac phases. These data sets can either be generated by multi-phase reconstruction at various phases prior to segmentation or locally during and on request of the segmentation process. The latter approach has the advantage that voxel positions may be directly reconstructed on a grid required, for example, for a curved MPR (multi-planar reconstruction) along the main vessel direction. This may automatically result in a high quality curved MPR. Interpolation from data sampled on a Cartesian grid will be obsolete.

Advantageously, as described above, this may allow for improved segmentation and visualization for vessels in coronary CTA. Also, a continuous and smooth coronary vessel visualization may be realized. The best cardiac phase selection may be steered by local segmentation results, which may allow to further improve the segmentation result.

Furthermore, in a variant of the above exemplary embodiment of the present invention, a process may be implemented where the operator may initiate the local segmentation in adjacent phases. For example, in case the operator is interest in more detail with respect to a certain area of the initial image, the operator may, for example, interactively indicate a region in the initial image for which he needs a better resolution. Then, segmentation is performed in this region in an adjacent image. In case the result is not sufficient yet, a further adjacent image may be used. By this, the region of interest selected by the operator may be examined throughout the whole data set, allowing for an enhanced segmentation result, i.e. for improved image, having, for example, a higher resolution.

Also, according to another variant of the above exemplary embodiment, a selection into which the further images to be examined are selected, may be selected. For example, an operator may inductively select whether the local segmentation should be performed in images succeeding the initial phase (with respect to the phase) or preceding the initial phase. However, this may also be selected automatically.

Figure 3:
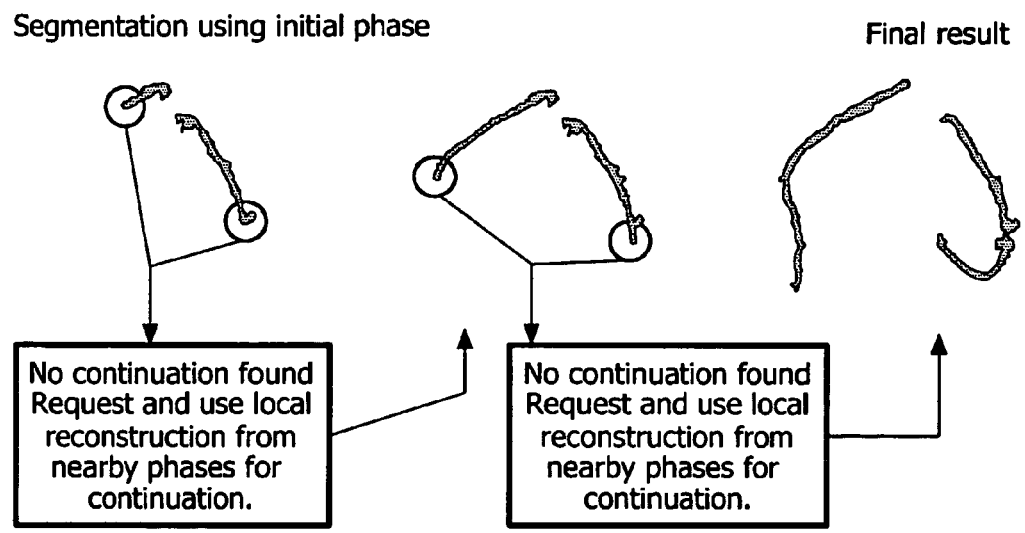
FIG. 3 shows a simplified representation of the segmentation of an artery branch performed according to an exemplary embodiment of the present invention.

FIG. 3 shows a branch of a coronary artery segmented in accordance with the present invention. The left image in FIG. 3 shows the segmentation result determined in the image of the initial phase. The image in the center of FIG. 3 shows an intermediate segmentation result, i.e. a combination of the segmentation result using the initial phase image and the segmentation result of a second image. Then, the image on the right side of FIG. 3 shows the final segmentation result, where the segmentation results of a plurality of phase images are combined to one final result.

As may be taken from the left image of FIG. 3, the segmentation stops in the encircled regions at the end of the respective branches. In other words, in these areas, no continuation is found for the respective vessel branches. Then, in the image in the middle of FIG. 3, the segmentation continued and further branch structures could be found. However, as indicated by the two circles at the end of the artery branches, in this second image no continuation could be found in these regions for the two vessel branches. Thus, a segmentation was performed in subsequent phase images. However, the segmentation is performed locally, i.e. not the whole image is segmented, but the segmentation is started in the region corresponding to the region of the branch where the segmentation stopped in the preceding image. Then, in case the respective branch structure may be continued per segmentation in the respective segmentation?, the segmentation process is continued until no continuation may be found. Then, the segmentation continues to the next subsequent image and a segmentation is performed in the branch region where the segmentation stopped in the preceding image. In case a continuation is found, the segmentation continues until no further continuation can be found.

Accordingly, since the segmentation in the respective subsequent image is not performed globally, i.e. for the full image, but for the respective region where the segmentation is stopped in the preceding image, the computational effort may be kept low. However, it should be noted that in case a continuation is found in this region, the segmentation continues until no continuation is found for this particular branch. Then, the method may continue until all images of the data sets have been used.

It should be noted that the coronary artery segmentation may be based, for example, on region growing in combination with an adaptive gray-value threshold and local shape analysis. It may usually be based on cardiac volume data sets, which are reconstructed for a single cardiac phase using retrospectively gated helical cardiac cone beam reconstruction. Modern CT systems enable multi-phase volume reconstruction.

The invention claimed is:
1. A method of segmenting an object of interest in a data set, wherein the data set comprises at least a first image and a second image, the method comprising the steps of:
    segmenting the object of interest with a processor in the first image for determining a first segmentation result;

determining a first structure of the object of interest where
the segmentation is unsuccessful in the first image; and
segmenting the first structure in a first region of the second
image for determining a second segmentation result;
wherein the first region is a local vicinity of the first structure.

2. The method of claim 1,
wherein the first and second images relate to at least one of
different points of time, different projections and different phases of a movement; and
wherein the first and second segmentation results are used
for generating an image such that the image is based on
information of the first image and the second image.

3. The method of claim 2,
wherein the data set is multi-dimensional and comprises
data relating to a plurality of phases of the object of
interest which is moving;
wherein the segmentation of the object of interest starts in
a first initial phase of the plurality of phases using data
relating to the first initial phase;
wherein, in case the segmentation fails for the first structure of the object of interest, the segmentation is continued in the first region in a second phase of the plurality
of phases using data relating to the second phase;
wherein the second phase is adjacent to the initial phase;
wherein, in case the segmentation of a second structure of
the object of interest in the second phase using data
relating to the second phase is unsuccessful, the segmentation continues in a second region of a third phase using
data relating to the third phase;
wherein the third phase is adjacent to the second phase; and
wherein the second region covers a vicinity of the second
structure.

4. The method of claim 1, wherein the data set comprises
the first image, the second image and a third image, wherein
the second image is adjacent to the first image in a first
direction with respect to a phase of the object of interest
which is moving, wherein the third image is adjacent to the
first image in a second direction with respect to the phase of
the object of interest, wherein the first direction is opposite to
the second direction, the method further comprising the step
of:
selecting a third direction of the first and second direction;
wherein, when the first direction is selected, the segmentation of the first structure is performed in the second
image; and
wherein, when the second direction is selected, the segmentation of the first structure is performed in the third
image.

5. The method of claim 1,
wherein the data set is a coronary CTA volume data set
comprising data from a plurality of cardiac phases; and
wherein the first and second images are at least two-dimensional; and wherein the method is for the segmentation
of a coronary artery tree.

6. An image processing device, comprising:
a memory for storing a data set comprising at least a first
image and a second image; and
an image processor for performing a segmentation of an
object of interest in the data set;
wherein the image processor is adapted to perform the following operation:
segmenting the object of interest in the first image for
determining a first segmentation result;
determining a first structure of the object of interest where
the segmentation is unsuccessful in the first image; and
segmenting the first structure in a first region of the second
image for determining a second segmentation result;
wherein the first region is a local vicinity of the structure.

7. The image processing device of claim 6,
wherein the first and second images relate to at least one of
different points of time, different projections and different phases of a movement; and
wherein the first and second segmentation results are used
for generating an image such that the image is based on
information of the first image and the second image.

8. The image processing device of claim 6, wherein the data
set is multi-dimensional and comprises data relating to a
plurality of phases of the object of interest which is moving;
wherein the segmentation of the object of interest starts in
a first initial phase of the plurality of phases using data
relating to the first initial phase;
wherein, in case the segmentation fails for the first structure of the object of interest, the segmentation is continued in the first region in a second phase of the plurality
of phases using data relating to the second phase;
wherein the second phase is adjacent to the initial phase;
wherein, in case the segmentation of a second structure of
the object of interest in the second phase using data
relating to the second phase is unsuccessful, the segmentation continues in a second region of a third phase using
data relating to the third phase; and
wherein the third phase is adjacent to the second phase;
wherein the second region covers a vicinity of the second structure.

9. A non-transitory computer-readable storage medium
containing instructions, that when executed on a processor of
a computer, segment an object of interest in a data set,
wherein the data set comprises at least a first image and a
second image, wherein the processor performs the following
operation when the instructions are executed on the processor:
segmenting the object of interest in the first image for
determining a first segmentation result;
determining a first structure of the object of interest where
the segmentation is unsuccessful in the first image; and
segmenting the first structure in a first region of the second
image for determining a second segmentation result;
wherein the first region is a local vicinity of the structure.

10. The image processing device of claim 6, wherein the
data set comprises the first image, the second image and a
third image, wherein the second image is adjacent to the first
image in a first direction with respect to a phase of the object
of interest which is moving, wherein the third image is adjacent to the first image in a second direction with respect to the
phase of the object of interest, wherein the first direction is
opposite to the second direction, the method further comprising the step of:
selecting a third direction of the first and second direction;
wherein, when the first direction is selected, the segmentation
of the first structure is performed in the second image;
wherein, when the second direction is selected, the segmentation of the first structure is performed in the third
image.

11. The image processing device of claim 6,
wherein the data set is a coronary CTA volume data set
comprising data from a plurality of cardiac phases;
wherein the first and second images are at least two-dimensional; and
wherein the method is for the segmentation of a coronary
artery tree.

12. The computer-readable storage medium of claim 9,
   wherein the first and second images relate to at least one of different points of time, different projections and different phases of a movement; and
   wherein the first and second segmentation results are used for generating an image such that the image is based on information of the first image and the second image.

13. The computer-readable storage medium of claim 12, wherein the data set is multi-dimensional and comprises data relating to a plurality of phases of the object of interest which is moving;
   wherein the segmentation of the object of interest starts in a first initial phase of the plurality of phases using data relating to the first initial phase;
   wherein, in case the segmentation fails for the first structure of the object of interest, the segmentation is continued in the first region in a second phase of the plurality of phases using data relating to the second phase;
   wherein the second phase is adjacent to the initial phase;
   wherein, in case the segmentation of a second structure of the object of interest in the second phase using data relating to the second phase is unsuccessful, the segmentation continues in a second region of a third phase using data relating to the third phase;
   wherein the third phase is adjacent to the second phase; and
   wherein the second region covers a vicinity of the second structure.

14. The computer-readable storage medium of claim 9, wherein the data set comprises the first image, the second image and a third image, wherein the second image is adjacent to the first image in a first direction with respect to a phase of the object of interest which is moving, wherein the third image is adjacent to the first image in a second direction with respect to the phase of the object of interest, wherein the first direction is opposite to the second direction, the method further comprising the step of:
   selecting a third direction of the first and second direction;
   wherein, when the first direction is selected, the segmentation of the first structure is performed in the second image; and
   wherein, when the second direction is selected, the segmentation of the first structure is performed in the third image.

15. The computer-readable storage medium of claim 9,
   wherein the data set is a coronary CTA volume data set comprising data from a plurality of cardiac phases; and
   wherein the first and second images are at least two-dimensional; and wherein the method is for the segmentation of a coronary artery tree.

16. The method of claim 1, wherein segmenting the object of interest is started from one or more user-defined start points.

17. The method of claim 1, wherein segmenting the object of interest is started from one or more automatically extracted start points.

18. The image processing device of claim 6, wherein segmenting the object of interest is started from one or more user-defined start points.

19. The image processing device of claim 6, wherein segmenting the object of interest is started from one or more user-defined start points.

20. The computer-readable storage medium of claim 9, wherein segmenting the object of interest is started from one or more user-defined or automatically extracted start points.

\* \* \* \* \*